United States Patent
Sadler

(10) Patent No.: US 6,408,407 B1
(45) Date of Patent: Jun. 18, 2002

(54) METHODS AND APPARATUS FOR DELEGATED ERROR HANDLING

(75) Inventor: Robert Francis Sadler, Cumming, GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/325,075

(22) Filed: Jun. 3, 1999

(51) Int. Cl.⁷ ................................................ G06F 11/00
(52) U.S. Cl. ................... 714/57; 714/2; 714/48
(58) Field of Search ................. 714/4, 48, 57, 714/31

(56) References Cited

U.S. PATENT DOCUMENTS

| | | | | |
|---|---|---|---|---|
| 3,575,589 A | * | 4/1971 | Neema et al. | 341/24 |
| 3,786,430 A | * | 1/1974 | Hajdu et al. | 703/21 |
| 3,818,199 A | * | 6/1974 | Grossmann et al. | 714/10 |
| 4,497,057 A | * | 1/1985 | Kato et al. | 340/461 |
| 4,598,356 A | * | 7/1986 | Dean et al. | 714/48 |
| 4,617,661 A | * | 10/1986 | Futaki et al. | 399/9 |
| 5,007,056 A | * | 4/1991 | Nakajima | 714/48 |
| 5,299,207 A | * | 3/1994 | Fujii | 714/45 |
| 5,440,688 A | * | 8/1995 | Nishida | 714/30 |
| 5,479,611 A | * | 12/1995 | Oyama | 714/48 |
| 5,494,136 A | * | 2/1996 | Humble | 186/61 |
| 5,748,880 A | * | 5/1998 | Ito et al. | 714/2 |
| 5,748,883 A | * | 5/1998 | Carlson et al. | 714/47 |
| 6,000,045 A | * | 12/1999 | Lewis | 709/223 |
| 6,128,017 A | * | 10/2000 | Alimpich et al. | 345/781 |
| 6,148,419 A | * | 11/2000 | Ahrens et al. | 710/15 |
| 6,173,422 B1 | * | 1/2001 | Kimura et al. | 348/180 |
| 6,269,460 B1 | * | 7/2001 | Snover | 714/48 |

* cited by examiner

Primary Examiner—Robert Beausoleil
Assistant Examiner—Gabriel L. Chu
(74) Attorney, Agent, or Firm—Peter H. Priest

(57) ABSTRACT

An error delegating processing system for performing operations under control of one or more applications, with device requests being made as needed by the applications. If a device returns a normal status, processing proceeds. If a device returns an error status, a specialized error handler performs error correction. The error handler examines the error status to determine if the error interferes with continued system operation. If not, the error status is logged for later correction and control is returned to the requesting application. If the error status interferes with continued operation, the error status is further examined to determine if it is correctable by a customer. If so, the error handler gives the customer instructions for correcting the error. If the error status is not correctable by the customer, the error handler suspends system operation and issues an alert for a non-customer user to correct the error status. Once the error status is corrected, control is returned to the requesting application.

24 Claims, 4 Drawing Sheets

METHODS AND APPARATUS FOR DELEGATED ERROR HANDLING

FIELD OF THE INVENTION

The present invention relates generally to device error management. More particularly, the invention relates to a system for delegation of recovery of hardware device errors to a specialized error handler suitable for use in data processing systems used in a retail environment.

BACKGROUND OF THE INVENTION

Many systems used in a retail environment use software applications to perform various operations. Each application may call on various hardware devices in performance of its tasks. Any of the hardware devices is subject to faults and errors. In systems of the prior art, faults and errors are typically handled by a return of an error status to the application which called on the device. After receiving the error status, the application must perform error correction. For example, a retail store may operate a self-checkout system to allow customers to handle their transactions and payments. This may include numerous hardware devices, including barcode scanners for item entry, magnetic stripe readers for reading credit or debit card information, printers for printing transaction receipts, and keypads for customer entry of data. Any of these hardware devices may be subject to faults and errors. For example, a barcode scanner may be unable to properly scan an item as a result of either a fault in the barcode, improper scanning procedure by the customer, or a fault in the scanner itself. A magnetic stripe reader may fail to properly read a credit or debit card. A printer may run out of paper. In conventional systems, each of these events causes a device to return an error code to the controlling application. A platform such as a checkout station may implement several different applications. For example, an item logging application may control scanning and logging of items in the transaction. A payment application may control acceptance of payment and closing of the transaction, with the payment application employing either a cash tender subapplication or a card tender subapplication, depending on whether payment is to be made with cash, or with a credit or debit card. The applications may share control of the same devices, for example a printer. This leads to redundancy of error handling software, and added expense due to the need to include error handling code in each application. For example, each application which calls the printer will sometimes encounter a printer failure and will need to process error messages from the printer and handle correction of the printer failure. The redundancy and accompanying excess expense is particularly pronounced when applications from different vendors reside on the same platform and share control of the same hardware devices. This is true because software applications from different vendors will be developed separately, and are unlikely to include any shared or copied code or procedures, even for functions which are duplicated between the applications, such as error handling procedures addressing errors in the same devices.

There exists, therefore, a need in the art for a system in which different operations may be performed by different applications which call hardware devices as required, and which provides for correction of and recovery from device errors in a way that avoids a need for error handling by each individual application, and therefore avoids the duplicate effort caused when multiple applications call a single device and when each of the applications is required to correct errors for the device.

SUMMARY OF THE INVENTION

A system employing the principles of the present invention may suitably be a customer self-checkout system used in a retail store. During normal operation, the system is typically operated by a user such as a retail customer. The system performs different operations in the performance of its functions, with different operations each being controlled by different software applications. In controlling the operations, the applications make requests to hardware devices as needed. If an application calls a device, and the device returns a normal status, the system logs a "success" status and the process proceeds normally. If the device does not return a normal status, the system determines if the status indicates that delegation to an error handler is indicated. If no delegation is indicated, the system returns the actual device status to the controlling application. If the status is one that should be delegated, the system attempts to look up the desired remedy from a database. The use of a remedy database allows configuring and scripting of actions to take for error correction. If the delegation system does not find an entry for the status, it pursues a default error handling routine. This is a predefined series of steps to be taken in a case in which no remedy is found in the database. After the default error handling routine has been completed, a "normal" status is returned and control is returned to the controlling application.

If the remedy for the error is found in the database, the delegation system proceeds to correct the error. After the delegation system finds the correct scenario to follow, it analyzes the actions prescribed, and the consequences of the error. If the error is one which does not affect the user, the system logs the error status to a file for later processing and returns a "normal" status to the application. If the error condition affects further operation of the system, the delegation system determines if the user can remedy the error, and if so, guides the user through the use of dialogs. If the error is not suitable for remedy by a user, an alert is issued to a store employee and the checkout system is taken offline until a store employee can sign on. At that point, the store employee is directed through a sequence of actions to be taken for remedy of the situation. If the checkout system operation is not affected, or if correction by the user or store employee is successful, the delegation system then returns a "success" status to the calling application, which is then free to continue. Otherwise, the checkout system remains offline until repairs can be made.

A more complete understanding of the present invention, as well as further features and advantages of the invention, will be apparent from the following Detailed Description and the accompanying drawings.

DETAILED DESCRIPTION

Figure 1:
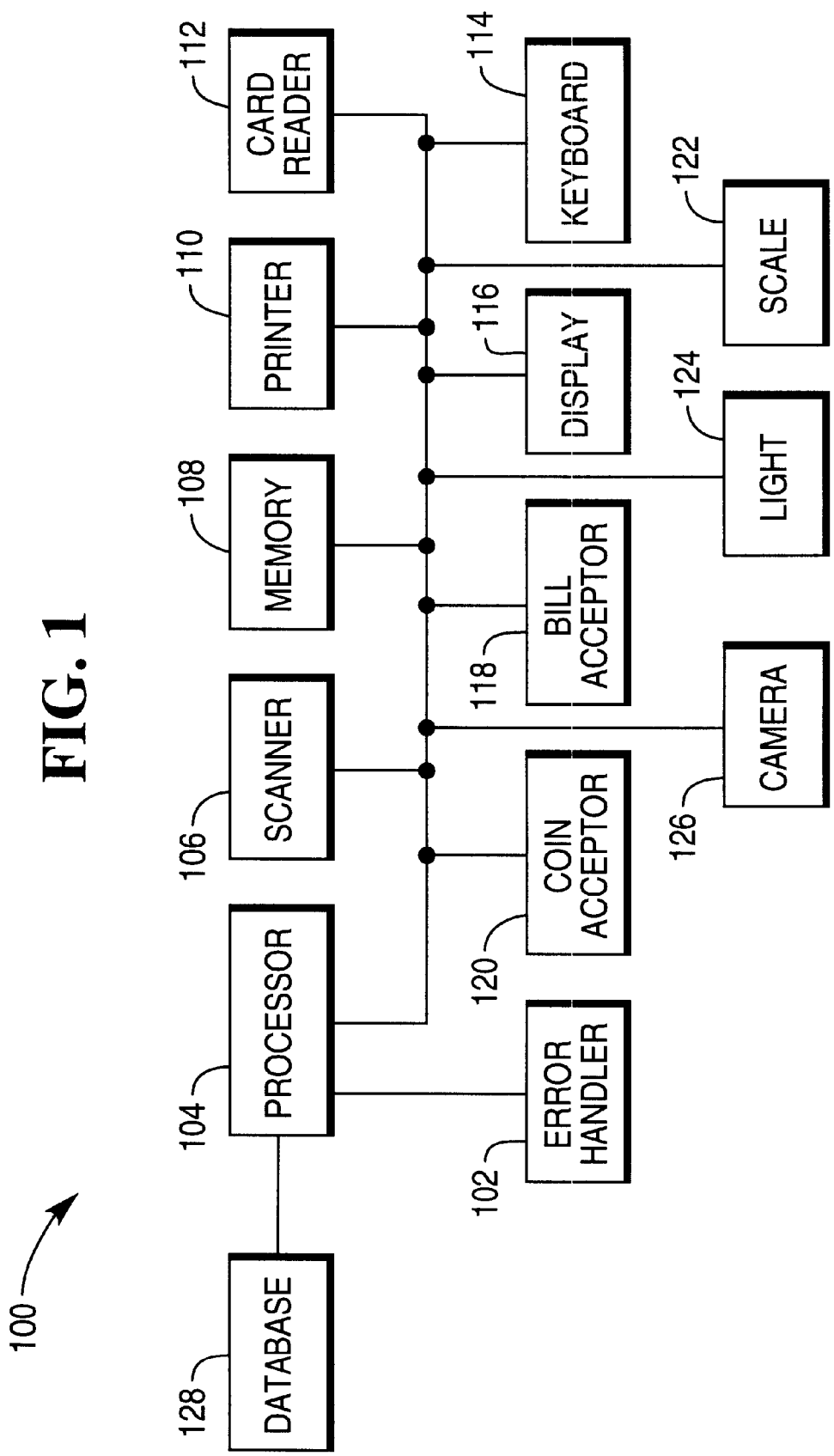
FIG. 1 illustrates a retail checkout system including an error handler according to the present invention.

FIG. 1 illustrates a retail checkout system 100 including an error handler 102 according to the present invention. The system 100 may suitably be implemented in a retail store as a customer self-checkout system at which the customer may register the items purchased and make payment. The system 100 includes a data processor 104, which communicates with the error handler 102, and which also controls one or more devices included in the checkout system 100. System 100 illustrated in FIG. 1 also includes a scanner 106, memory 108, printer 110, magnetic stripe reader 112, keyboard 114, display 116, bill acceptor 118, coin acceptor 120, scale 122, indicator light 124 and camera 126. It will be recognized that fewer or additional devices may be employed to suit a particular application. The data processor 104 typically directs performance of a variety of operations, each operation being performed under control of a software application. Each of the software applications calls on one or more devices as needed in performance of its operations.

In systems of the prior art, a failure or error in a device causes return of an error status to the controlling application. The controlling application must then correct or otherwise deal with the error. For this reason, applications used in systems of the prior art must have procedures for dealing with device errors. When several different applications control the same device, these procedures are often redundant, as procedures for dealing with errors for each device must be developed for each application controlling the device. Moreover, device changes requiring changes to returned error codes, for example, or methods for dealing with device errors, require each application controlling a device to be modified whenever such a change is made to a device.

In order to provide for efficient handling of errors, the system 100 provides for the processor 104 to be able to refer device errors to the specialized error handler 102. The error handler 102 can analyze each error, determine whether the error prevents operation, and take the necessary steps to correct errors which have been determined to prevent operation. Upon receiving an error status from a device, the processor 104 looks up the error status in a delegated actions database 128. The delegated actions database 128 preferably includes each possible device error status. The database 128 includes an indication, associated with each device error status, determining whether the device status is to be delegated to the error handler 102. If the error status is not to be delegated, the processor 104 returns the actual device status to the referring application. If the error status is to be delegated, the processor 104 turns control-over to the error handler 102.

Upon receiving an error status from the processor 104, the error handler 102 evaluates the error. If the error does not interfere with present operation of the system 100, the error handler 102 logs the error for later correction, and returns a "success" status to the processor 104, which in turn returns a "success" status to the calling application. An example of a device which could fail without interfering with operation would be the camera 126. Typically, a camera such as the camera 126 is used simply to capture an image of the customer in order to provide added security by helping to identify a customer in case of fraud. If the camera failed, it might be desired to allow the transaction to continue, even if no image of the customer could be retained. In such a case the error handler would be programmed to allow operation to continue, while logging the error.

If the error must be corrected in order for operation to continue, the error handler 102 evaluates the error to determine if it is correctable by the customer. As an example, the scanner 106 may have returned a failed scan attempt, or the printer 110 may be out of paper. If the error is correctable by the customer, the handler 102 guides the customer through correction of the error. For example, if the scanner 106 has returned a failed scan attempt, the customer may simply be instructed to repeat the scan. This may be done by issuing an instruction on a display screen, optionally accompanied by an alert tone, with a voice instruction, or in any of a number of different ways. If the remedy by the customer is successful (for example, if the customer has successfully repeated the scan), the error handler 102 returns a "success" status to the calling application.

On the other hand, if the error is not correctable by the customer or is correctable but has not been corrected within a predetermined period of time or number of attempts, the error handler takes the checkout system offline and alerts a store employee, who is directed to come to the checkout system and correct the error. For example, if the printer 110 is out of paper, a store employee would be instructed to come to the checkout system. After correction of the error, the checkout system is put back online and a "success" status is returned to the calling application.

Figure 2:
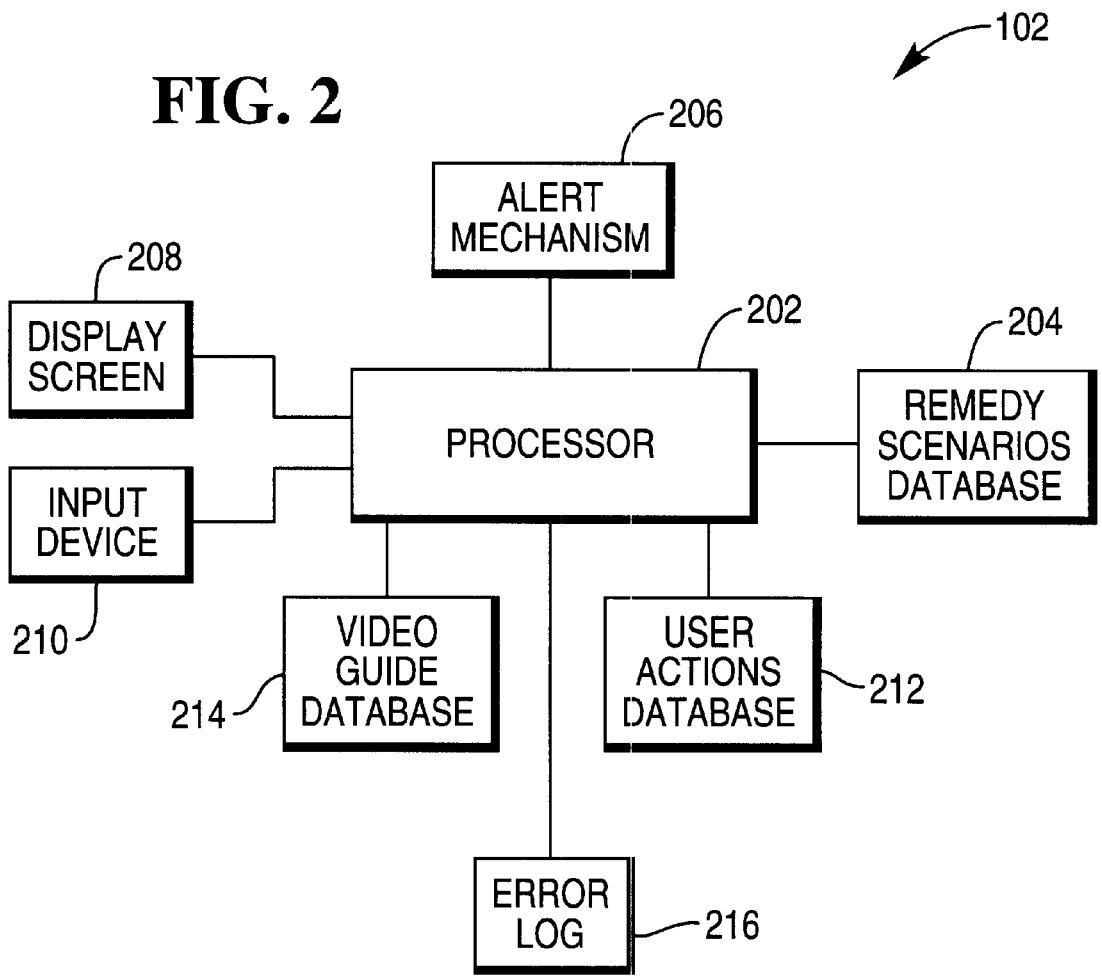
FIG. 2 illustrates further details of an error handler according to the present invention.

FIG. 2 illustrates in further detail the error handler 102 shown in FIG. 1. The error handler 102 includes an error processor 202 which receives an error status and manages a response to the error. The error handler 102 also includes a remedy scenarios database 204, which is connected to and is accessible by the processor 202. The remedy scenarios database 204 includes possible error statuses and steps for remedying each error status included in the database 204. This information preferably includes information about whether the error status interferes with operation, and whether the error status can be repaired by a user. The error handler 200 includes an alert mechanism 206 for providing an alert indicative of an error. The alert mechanism may include a pager, an alarm, a display or some other appropriate alerting device. The error handler 102 also includes a display screen 208 for communicating status and error correction information to a customer or store employee, as well as an input device 210 for receiving needed inputs from a customer or store employee.

The error handler 102 further includes a user actions database 212 which includes a sequence of step by step user actions to be taken to execute each remedy scenario, as well as a video guide database 214, which includes video instructions to be displayed to provide assistance to a customer or store employee with respect to the step by step instructions to be followed in executing a particular remedy scenario responsive to the error status. The video instructions are received from the video guide database 214 and displayed on the display screen 208 as part of the error resolution procedure. The error handler 102 also preferably includes an error log 216 for logging error statuses and resolutions.

When the error handler 102 receives an error status, the error processor 202 looks up the error status in the remedy scenarios database 204. If the error status is included in the remedy scenarios database, the processor retrieves the appropriate remedy for the error status. If the error status is not included, the error processor 202 uses the alert mechanism 206 to alert a store employee that a default scenario is to be executed. The default scenario is a predetermined scenario to be executed whenever an error status is received which is not included in the remedy scenarios database 204. After the default scenario is executed, the error processor returns a "success" status to the referring application and returns control to the referring application. If the error status is included in the database 204, the error processor 202 analyzes the error status and the remedy associated with the error status. For example, a printer may return a status indicating that the printer paper is low. This type of error status does not prevent continued operation, but should be noted and remedied as soon as it is convenient to do so. If an error status does not interfere with operation, the error processor 202 logs the error in the error log 216, preferably with an alert that the error needs to be remedied. However, the error handler 102 does not take immediate steps to remedy the error, and does not stop operation. The error handler 102 returns a "success" status to the referring application.

If an error status does interfere with continued operation, the error processor 202 will further analyze the error status and remedy to determine if the error status can be resolved by the customer. If the error is remediable by the customer, the error processor 202 retrieves appropriate user actions from the user actions database 212 and video help from the video guide database 214, in order to guide the customer through the error remedy. This information may suitably be displayed on the display screen 208. For example, if an item failed to scan properly, the user may be instructed to rescan the item. During resolution of an error status the customer may be prompted to make entries using the input device 210. For example, the customer may press a key after following each instruction of a series of instructions in order to call for display of the next instruction. If the customer is successful in correcting the error status, the error processor 202 logs the error, and the remedial steps taken, to the log 216 and returns a "success" status to the referring application. Alternatively, if the customer is unwilling to attempt resolution of the problem, or tries and fails to solve the problem according to displayed instructions, the customer may make an entry using the input device 210, to inform the error processor 202 that the customer is unable to resolve the error status.

If the error is not remediable by the customer, or if the customer has chosen not to attempt resolution, or resolution attempts by the customer have been unsuccessful, the error processor 202 provides an alert to a store employee and takes the system offline. Once the store employee arrives, the error processor 202 retrieves appropriate user actions from the user actions database 212 and video instructions from the video guide 214, in order to guide the store employee through the error remedy. It may be desired to allow a proficient store employee to simply correct the error without referring to step by step instructions, and indicate when the error has been corrected. If so, the employee simply indicates this fact by making an appropriate entry using the input device 210. The error processor 202 then allows error correction without presenting the step by step error correction process, but simply waits for the employee to make another entry using the input device 210 to indicate that error correction has been completed. When the error is corrected, the error processor 202 puts the checkout system back online and returns a "success" status to the referring application. If the error cannot be corrected by the store employee or if attempts to remedy the error are unsuccessful, the employee indicates this and the checkout system remains offline until suitable correction can be performed.

Figure 3A:
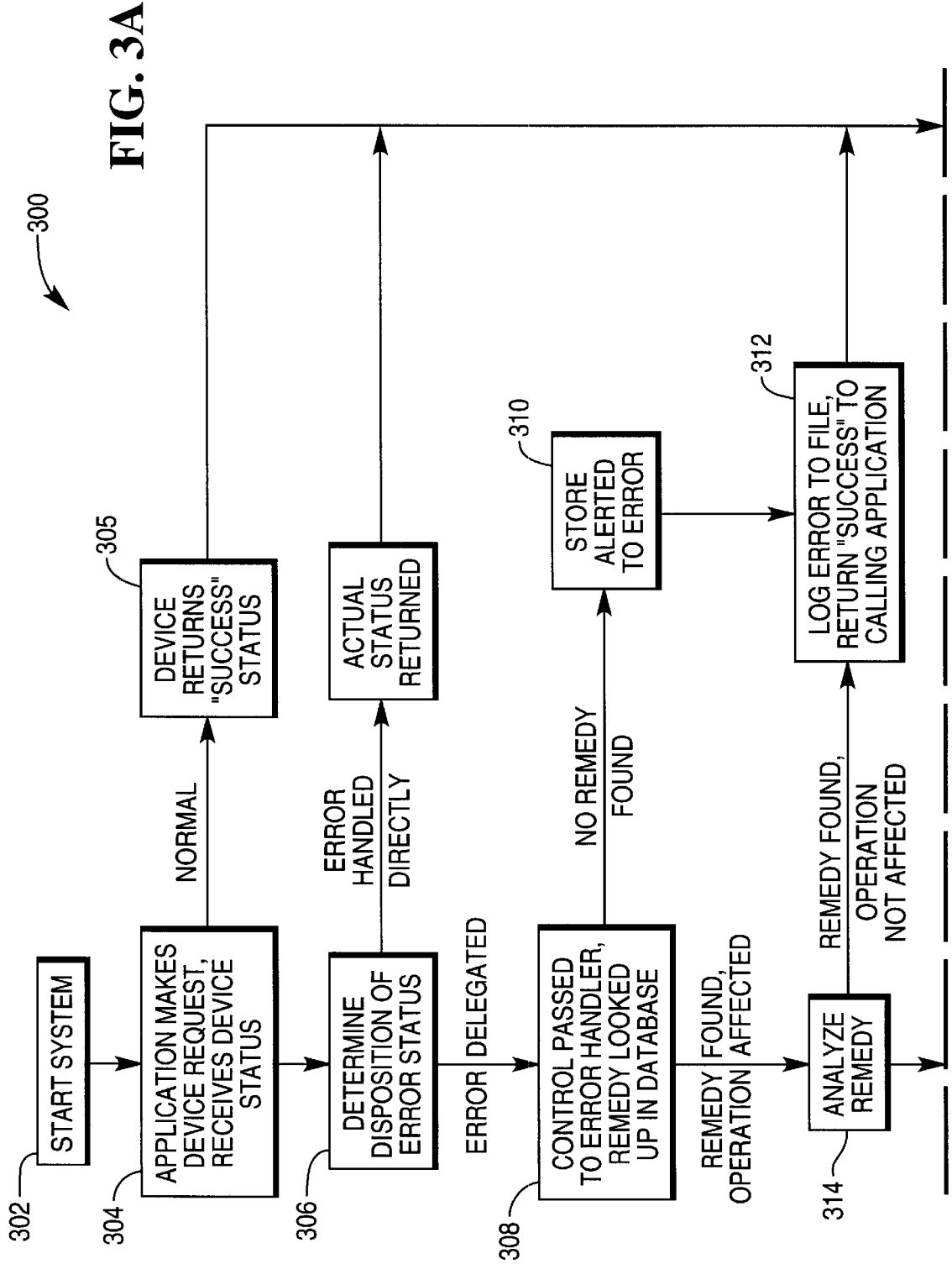
FIGS. 3A and 3B illustrate a method of error handling according to the present invention.
Figure 3B:
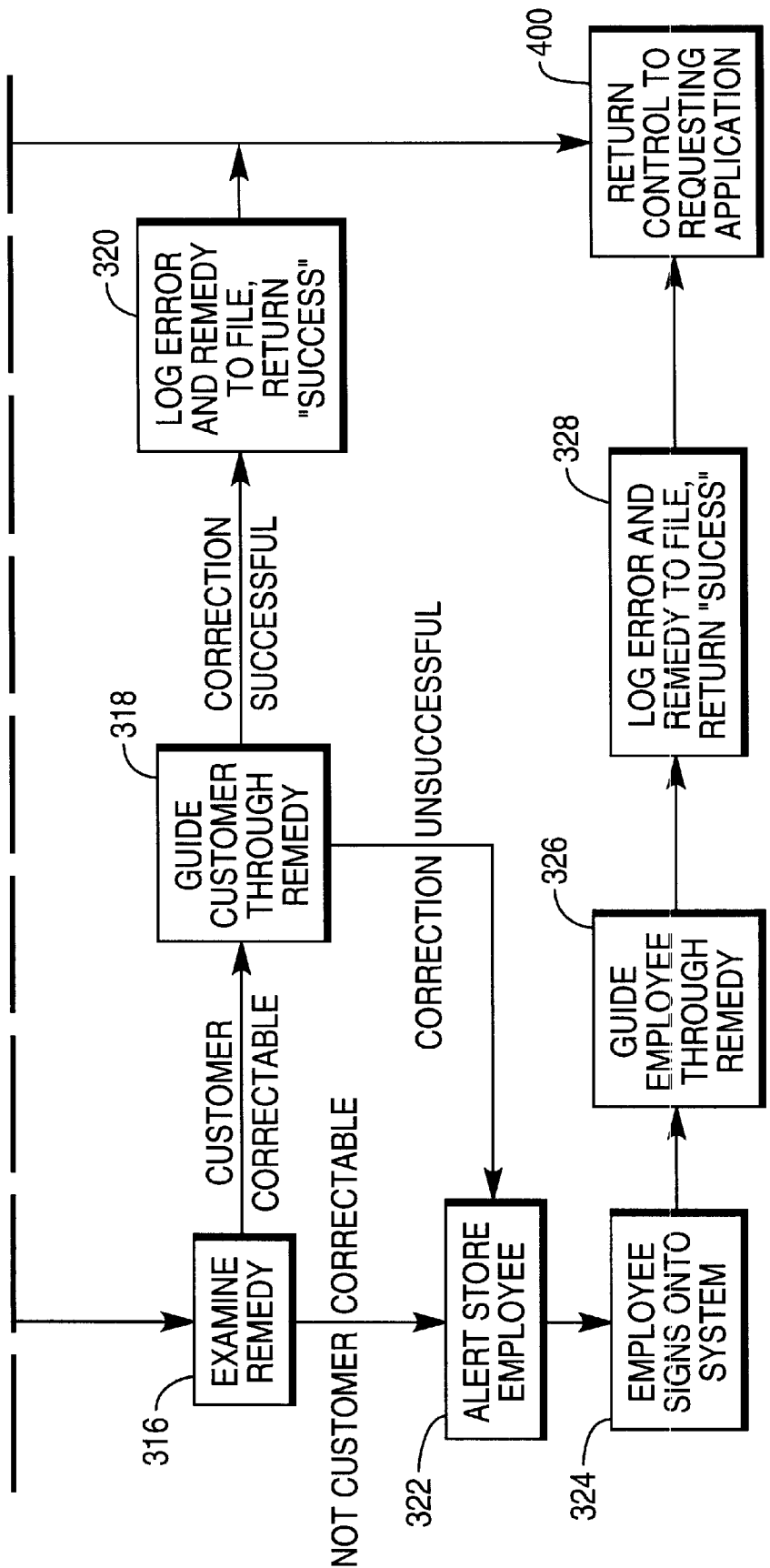

FIG. 3 illustrates the steps of a method 300 for error delegation and handling according to the present invention. The method 300 is advantageously used in a customer self-checkout system operating in a retail store. The self-checkout system performs various operations in the self-checkout process, each operation being performed under the control of a software application. Each application calls on various hardware devices in order to perform its operations. At step 302, the self-checkout system is started and performs operations as needed, with different operations being performed by different software applications. At step 304, an application performing an operation makes a device request and the requested device returns a status. If the status is normal, the process continues at step 305, a "success" status is returned to the requesting application and the process then continues at step 400, returning control to the requesting application. If the status is an "error" status, the process continues at step 306. At step 306, the device status is looked up in a delegated actions database to determine disposition of the error status. If the error status is to be handled directly by the requesting application, the process continues at step 307, the actual device status is returned to the application and the process continues at step 400. In this case, the requesting application performs error handling according to its own procedures for handling the error status which has been returned. If the error handling is to be delegated, the process continues at step 308, the error status is passed to an error handler such as the error handler 102 illustrated in FIG. 2, and the error handler searches for a remedy for the error in a remedy scenarios database. If a remedy is not found, the process continues at step 310 and a store employee is alerted that an error exists. A default remedy scenario is performed, which is a standard scenario performed for all error status indications which do not have a specific remedy in the database. The process then continues at step 312 and the error and remedy are entered in an error log file, and a "success" status is returned to the application which requested the device. The process then continues at step 400. If a remedy is found in the database, the process continues at step 314 and the remedy is analyzed to determine if the error interferes with continued operation of the system. If the error does not interfere with continued operation of the system, the process continues at step 312. If the error does interfere with continued operation of the system, the process continues at step 316 and the remedy is examined to determine if the error status is correctable by the user. If the error status is correctable by the user, the process continues at step 318. At step 318, the error handler provides instructions to the user for remedying the error status, by retrieving instructions from user action guides and video guides and providing appropriate instructions to the user. If the user successfully corrects the error, the process continues at step 320, a "success" status is passed to the requesting application, and the process continues at step 400. If the user does not successfully correct the error, the process continues at step 322.

Similarly, if the error status cannot be corrected by the user, the process continues at step 322. At step 322, a store employee is alerted. At step 324, the store employee signs onto the checkout system. At step 326, the store employee is guided through correction of the error status through retrieval and display of appropriate steps from video guides and user action guides. Alternatively, the system may allow an employee to solve the problem without referring to the video guides and user action guides, and simply indicate when the problem has been resolved. If the error cannot be corrected by the employee, or if attempts to correct the error are unsuccessful, the employee indicates this and the system remains offline until suitable correction can be made.

If the employee is successful in correcting the error, the process continues at step 328, a "success" status is passed to the requesting application, and the process then continues at step 400. At step 400, control is returned to the requesting application. The requesting application proceeds according to its own instructions until the next time a device request is called for. At that point, the process begins at step 304.

While the present invention is disclosed in the context of a presently preferred embodiment, it will be recognized that a wide variety of implementations may be employed by persons of ordinary skill in the art consistent with the above discussion and the claims which follow below.

I claim:

1. An error delegating data processing system performing financial and customer checkout transactions in a retail environment, the system performing operations under control of one or more applications, one or more of the applications making requests to one or more devices as needed during processing, each device returning a device status in response to a request, the device status comprising a normal status or one of one or more possible error statuses, the system comprising:

a control processor for performing the operations under the control of the applications, the control processor being operative to receive the device status after request of a device by a requesting application, the control processor continuing operation under the control of the requesting application if the device status is a normal status, the control processor passing control for error handling if the device status is an error status; and an error handler for receiving the error status from the control processor and implementing error correction, the error handler returning a normal device status to the application and returning control to the application after correction of the error.

2. The processing system of claim 1, wherein the control processor is operative to analyze the error status to determine if the error status is to be delegated and to return the actual device status to the requesting application if the error status is not to be delegated, the control processor being operative to pass the control to the error handler if the error status is to be delegated.

3. The processing system of claim 2, wherein the error handler includes an error processor operative to analyze the error status to determine if the error status interferes with continued operation of the system and to return control to the control processor if the error status does not interfere with continued operation of the system.

4. The processing system of claim 3, wherein the error processor is operative to further analyze the error status to determine if the error status is correctable by a customer and to direct correction of the error status by the customer if the error is correctable by the customer, if the error status does interfere with continued operation of the system.

5. The processing system of claim 4, wherein the error processor issues an alert to a retail employee for error correction if the error is not correctable by the customer, and is further operative to return a normal device status to the application and return control to the application after correction of the error status by the retail employee.

6. The system of claim 5, wherein the error processor is operative to log the error status before returning control to the control processor if the error status does not interfere with operation of the system.

7. The system of claim 6, wherein the error processor is operative to issue an alert for later correction of the error status before returning control to the control processor if the error status does not interfere with operation of the system.

8. The system of claim 7, and also including a remedy scenarios database including one or more possible error statuses and a remedy scenario associated with each possible error status included in the database and wherein the error processor is operative to search the database for the received error status and retrieve an associated remedy scenario from the remedy scenarios database, the error processor then analyzing the retrieved remedy scenario in order to determine if the received error status interferes with continued operation of the system.

9. The system of claim 8, wherein the error processor issues an alert and implements a default remedy scenario if the error status does not appear in the remedy scenarios database.

10. The system of claim 9, wherein the error processor logs the error status to an error log.

11. The system of claim 10, wherein the error processor further analyzes the retrieved remedy scenario in order to determine if the error status is correctable by the customer.

12. The system of claim 11, wherein the error handler also includes a user actions database for retrieving instructions to be given to a user in order to correct the error status.

13. The system of claim 12, wherein the error handler further includes a video guide database for retrieving video displays to be provided to the user for assistance in implementing the instructions retrieved from the user actions guide.

14. A method of error handling in a processing system performing operations under the control of one or more applications, one or more of the applications making requests to one or more devices as needed during processing, each device returning a device status in response to a request, the device status comprising a normal status or one of one or more possible error statuses, comprising the steps of:

starting the system;

operating the system under control of one or more applications, each application taking control as needed for operation, each application making one or more device requests as required;

receiving a device status from a requested device;

if the device status is normal, continuing operation under control of the requesting application;

if the device status is an error status, analyzing the error status to determine if the error status is to be managed by the requesting application or delegated;

if the error status is to be managed by the requesting application, returning the actual error status to the requesting application and returning operation control to the requesting application;

if the error status is to be delegated, analyzing the error status to determine if the error status interferes with continued operation of the system and if the error status does not interfere with operation of the system, returning control to the requesting application;

if the error status interferes with continued operation of the system, analyzing the error status to determine if the error status is correctable by a customer;

if the error status is correctable by the customer, guiding the customer through error correction; and if the error status is not correctable by the customer, issuing an alert for correction of the error status.

15. The method of claim 14 and also including the step of logging the error status for later correction if the error status does not interfere with continued operation.

16. The method of claim 15 and also including the step of issuing an alert for later correction if the error status does not interfere with continued operation.

17. The method of claim 16, wherein the step of analyzing the error status to determine whether the error status interferes with continued operation of the system includes looking for the error status in a remedy scenarios database and examining information associated with the error status to determine if the error status interferes with continued operation of the system.

18. The method of claim 17, wherein the step of analyzing the error status is followed by the step of implementing a default remedy scenario, issuing a default alert, and logging the error status if the error status does not appear in the remedy scenarios database.

19. The method of claim 18, wherein the step of guiding the customer through error correction includes retrieving user instructions from a user guide database and presenting the instructions to the customer.

20. The method of claim 19, wherein the step of guiding the customer through error correction further includes retrieving video displays from a video guide database for presentation to the customer for assistance in implementing the user instructions.

21. The method of claim 20, wherein the step of guiding the customer through error correction is followed by the step of logging the error status and remedy, returning a normal status to the requesting application, and returning control to the requesting application.

22. The method of claim 21, wherein the step of issuing an alert for correction of the error status includes removing the system from active operation until correction of the error status.

23. The method of claim 22, wherein the step of issuing an alert for correction of the error status is followed by the step of guiding a non-customer operator through correction of the error status.

24. The method of claim 23, wherein the step of guiding the non-customer operator through error correction is followed by the step of logging the error status and remedy, restoring the system to active operation, returning a normal status to the requesting application, and returning control to the requesting application.

* * * * *